Figure 1:
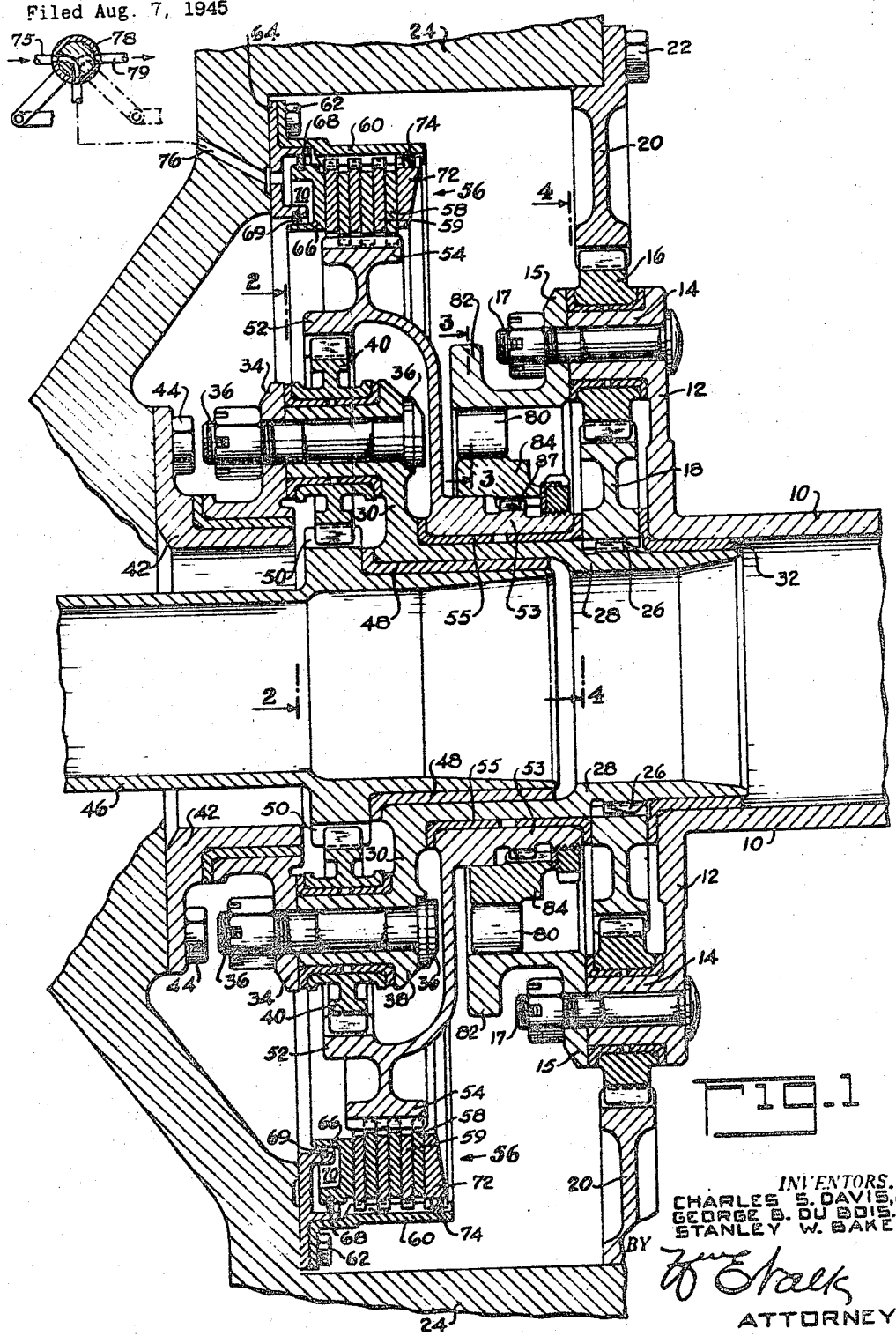

July 3, 1951

C. S. DAVIS, JR., ET AL 2,558,738

MULTISPEED TRANSMISSION

Filed Aug. 7, 1945

4 Sheets-Sheet 1

INVENTORS.
CHARLES S. DAVIS, JR.
GEORGE B. DU BOIS.
STANLEY W. BAKER.

BY
ATTORNEY

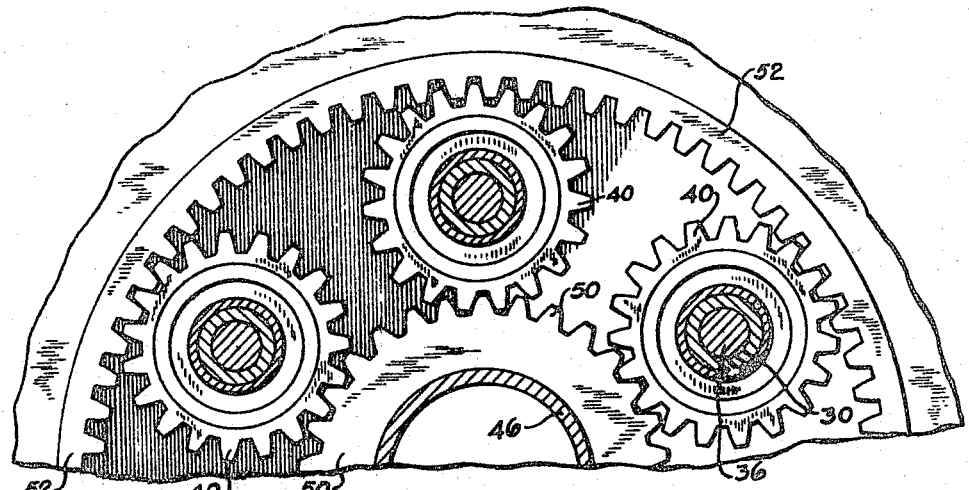
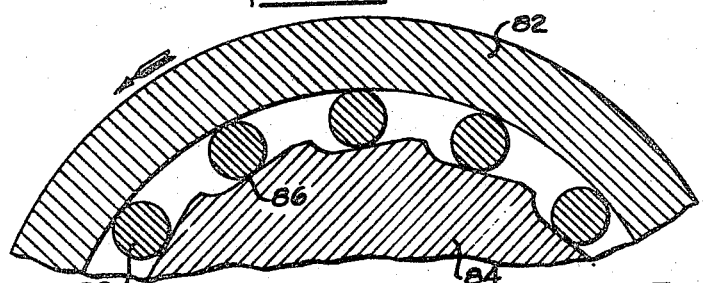
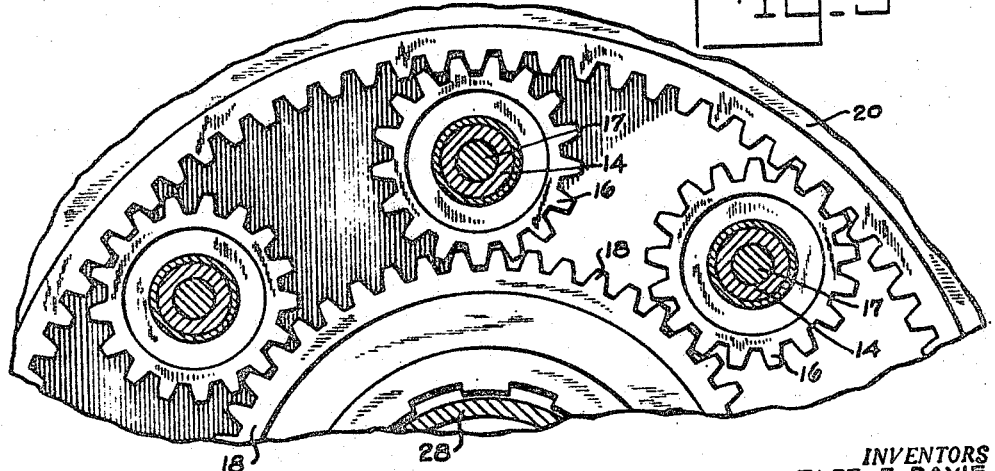

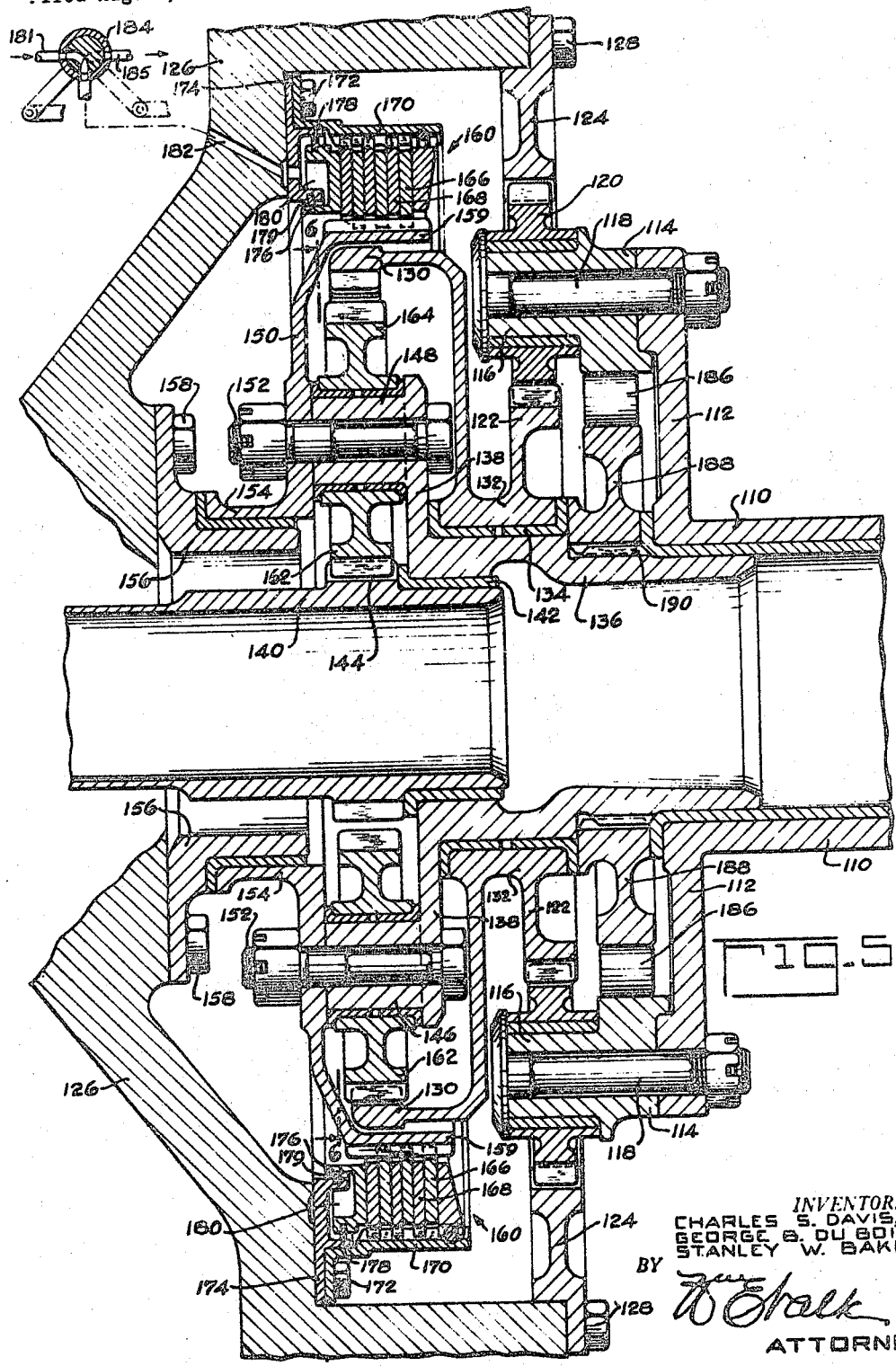

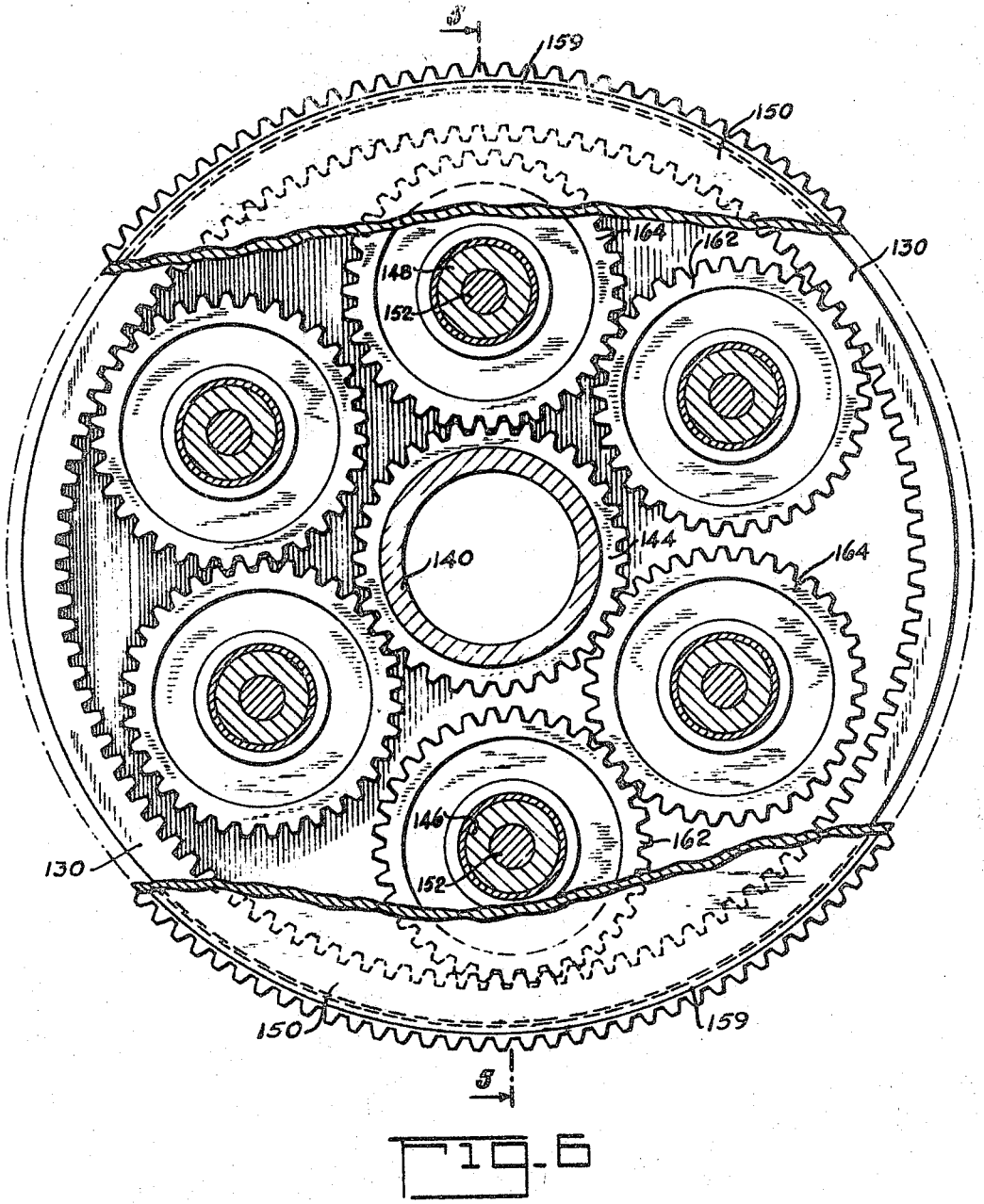

Patented July 3, 1951

2,558,738

UNITED STATES PATENT OFFICE 2,558,738

MULTISPEED TRANSMISSION

Charles S. Davis, Jr., Paterson, George B. Du Bois, Radburn, and Stanley W. Baker, Paramus, N. J., assignors to Wright Aeronautical Corporation, a corporation of New York Application August 7, 1945, Serial No. 609,432

18 Claims. (Cl. 74—785)

This invention relates to multi-speed transmissions and is particularly directed to a two-speed transmission for driving a supercharger for an internal combustion engine. However, the invention is not limited to this specific use but is of general application.

Aircraft engines are commonly provided with engine driven multi-speed superchargers whereby the engine can develop its maximum power at low altitudes with the supercharger driven at its low speed and at high altitudes with the supercharger driven at its high speed. It is an object of this invention to provide a new and improved two-speed planetary gear drive adapted to drivably connect an engine with a supercharger therefor.

It is a further object of this invention to provide a new and improved two-speed planetary gear transmission comprising only simple gears, that is, having no compound gears. In addition, the transmission of the present invention is designed so that its speed changing clutches or brakes have relatively low-engaging speeds as compared to the speed of the transmission output shaft. This latter feature is quite important in connection with engine-driven superchargers, particularly for aircraft engines, since such superchargers are driven at high speeds considerably in excess of engine speeds. For example, aircraft engines may have normal speeds in the neighborhood of 2400 R. P. M. and their superchargers may be driven at speeds in excess of 20,000 R. P. M.

Furthermore, because of the high rotative speeds of aircraft engine superchargers, it is important, in a planetary gear drive for such a supercharger, that the speed of rotation of the planetary carrier be kept relatively low in order to avoid high planet pinion bearing loads as a result of the centrifugal forces acting on the planet pinions. This objective is also attained with the present invention, particularly with the second form of the invention as hereinafter described.

Specifically, the invention comprises a primary speed step-up from the input shaft to a planetary gear train which, in turn, provides a further speed step-up to the output shaft. The two speeds of the output shaft are effected by locking or clutching the reaction member of the planetary gear train either to a fixed member or to a member rotating at the speed of the input shaft. With this arrangement in neither speed ratio are any of the gears locked together and instead all meshing gears are in continuous rolling engagement.

Other objects of this invention will become apparent upon reading the annexed detailed description in connection with the drawing in which:

Figure 1 is an axial sectional view of a transmission embodying the invention;

Figures 2, 3 and 4 are sectional views respectively taken along lines 2—2, 3—3 and 4—4 of Figure 1;

Figure 5 is an axial sectional view taken along line 5—5 of Figure 6 and illustrates a modified form of the invention; and Figure 6 is a sectional view taken along line 6—6 of Figure 5.

The invention is described in connection with a two-speed drive for an internal combustion engine supercharger. However, the invention obviously is not limited to this specific application but instead is of general application.

Referring first to Figures 1 to 4, an input shaft 10 driven at engine speed is provided with a radially-extending annular flange 12 having a plurality of circumferentially spaced studs 14 formed thereon. Planet pinions 16 are journaled about the studs 14 and are held thereon by an annular plate 15 secured to the stud ends opposite the flange 12 by bolts 17 passing through the studs. The planet pinions 16 are disposed in meshing engagement with an inner annular gear 18 and an outer annular gear 20 concentric with said inner gear. The outer annular gear 20 is held against rotation by bolts 22 securing the gear to the fixed housing structure 24. With this construction, a speed step-up drive is provided from the input shaft 10 to the gear 18. However as will be obvious, the invention is not limited to any specific form of step-up drive from the shaft 10 to the gear 18.

Preferably, the outer annular gear 20 is secured to the housing 24 through a flexible support instead of, as illustrated, directly to the housing 24. A suitable conventional flexible support for the reaction member of a planetary gear drive is illustrated in the co-pending application Serial No. 503,144 of H. C. Hill now Patent No. 2,407,699.

The inner annular gear 18 is splined at 26 to the hub portion 28 of the planet carrier member 30. The hub portion 28 of the planet carrier member 30 is piloted within the input shaft 10 by a bushing 32. In addition, a plate 34 is secured to the planet member by bolts 36 passing through a plurality of studs 38 formed on the member 30 and about which the planet pinions 40 are journaled. The planet carrier plate 34 is journaled about a drum 42 secured to the fixed housing structure 24 by bolts 44.

An output shaft 46 for the engine supercharger (not shown) is piloted within the hub portion 28 of the planet carrier member 30 by a bushing 48. A gear 50 formed on the output shaft 46 is disposed inwardly of, and in meshing engagement with, the planet pinions 40. An annular gear 52 concentric with the output gear 50 is disposed outwardly of, and in meshing engagement with, the planet pinions 40. The annular gear 52 has a hub portion 53 piloted about the planet carrier hub 28 by a bushing 55. In addition, the gear 52 has a rim portion 54 engageable by a friction brake 56 for clutching the gear 52 to the housing 24.

The friction brake 56 comprises a plurality of annular frictionally engageable plates 58 and 59, alternately disposed and splined respectively to the outer rim 54 of the gear 52 and to a drum 60 secured to the housing 24 by bolts 62. An annular member 64 is also secured to the housing 24 by the bolts 62 and a piston 66 has seal rings 68 and 69 cooperating with the member 64 to provide a sealed annular cylindrical space 70 relative to which the piston 66 is axially slidable. An end plate 72 is also splined to the drum 60 at the end of the stack of friction plates remote from the piston 66 and this end plate is held against axial movement by suitable locking means 74. A fluid under pressure is adapted to be supplied to the cylindrical space 70 through passage 75, valve 78 and passage 76 when the valve 78 is in the full line position illustrated. When the valve 78 is in its dotted line position, the friction brake cylinder 70 is connected to a drain passage 79, whereupon the brake disengages.

With this construction of the friction brake 56, when the valve 78 is opened to supply fluid pressure to the cylindrical space 70, the piston 66 clamps the plates 58 and 59 together, thereby clutching the annular gear 52 to the fixed housing 24. When the gear 52 is thus held against rotation, a step-up speed ratio is provided from the gear 18 to the output shaft 46. That is, when the brake 56 is engaged, the gear 52 is clutched to the housing 24 to provide a fixed torque reaction member for the planetary gear train comprising gears 40, 50 and 52.

With some load on the output shaft 46, when the brake 56 is released, the output shaft 46 immediately begins to slow down and, accordingly, the reaction gear 52 starts to rotate at a speed which increases as the speed of the output shaft 46 falls off. Reaction gear 52 rotates in the same direction as the planet carrier member 30 which, in turn, rotates in the same direction as the input shaft 10.

The speed of rotation of the reaction gear 52 is limited by a one-way or over-running clutch having rollers 80 which prevent the reaction gear 52 from rotating at a speed in excess of the speed of the input shaft 10. Accordingly, when the brake 56 is released, the speed of the output shaft 46 slows down until the reaction gear 52 is rotating at the same speed as the input shaft 10 whereupon the one-way clutch rollers 80 engage to prevent any further reduction in speed of the output shaft 46 relative to the input shaft 10. The planet carrier member 30 is driven by the gear 18 at a speed in the same direction but in excess of the speed of the input shaft 10 and with the brake 56 released, the reaction gear 52 rotates in the same direction and at the same speed as the input shaft 10. Therefore, with the brake 56 released, a step-up speed ratio is provided from the gear 18 to the output shaft 46 but the magnitude of this step-up in the speed ratio is less than the magnitude of the step-up in the speed ratio when the reaction gear 52 is locked by engagement of the brake 56.

The one-way or over-running clutch comprises the rollers 80 disposed between a drum 82 formed on the plate 15 and an annular cam member 84 of conventional construction. The cam member 84 has a series of cam surfaces 86, each providing a wedge-shaped space between it and the interior surface of the drum 82 and within which one of the rollers 80 is received. The cam member 84 is splined at 87 to the hub 53 of the reaction gear 52. The arrangement is such that with the input shaft rotating, for example, in a counterclockwise direction as indicated by the arrow in Figure 3, and with the cam member 84 held fixed by engagement of the brake 56, the drum 82 merely over-runs the rollers 80. When the brake 56 is released, the reaction gear 52 starts rotating and when the gear 52 and its cam member 54 tend to rotate faster than the input shaft 10, the rollers 80 automatically wedge between the cam surfaces 86 and the interior surface of the drum 82 to prevent any further increase in speed of the reaction gear 52.

With the aforedescribed construction, when the valve 78 is opened to admit fluid pressure to the cylindrical space 70, the brake 56 is engaged to provide a high step-up speed ratio from the gear 18 to the output shaft 46. When the valve 78 closes the pressure supply line 75, the brake 56 disengages and the one-way clutch rollers 80 automatically engage to provide a low step-up speed-ratio from the gear 18 to the output shaft 46.

The aforedescribed two-speed transmission construction possesses numerous desirable operating features. Thus, the relative rotative speed of the brake plates 58 and 59 just prior to their engagement is only equal to the low speed of the input shaft 10 thereby minimizing scuffing and wearing of these plates. The one-way or over-running clutch also only rotates at the speed of the input shaft 10. In fact, the rollers 80 of this clutch engage with a synchronized engagement—that is, with substantially no shock. This is so because when the brake 56 is released, the reaction gear 52 and its cam member 84 immediately rotate at a gradually increasing or accelerating speed in the same direction as the drum 82. Accordingly, the inertia of the rollers 80 causes these rollers to lag behind the accelerating cam member 84 and therefore the rollers ride up their cams 86 so that the moment the cam member 84 tends to over-run the drum 82, the rollers 80 are right in position for engagement and they immediately engage or wedge between the cams 86 and drum 82.

Another feature of the above-described planetary gear train is that the meshing gears are all in continuous rolling engagement in both speed ratios. That is, in neither speed ratio are any of the gears locked together to provide a splined drive therebetween. When such a splined drive is created between a pair of gears, the load is transmitted continuously by those few teeth of the gears which happen to be locked together, whereas, when a pair of gears are in continuous rolling engagement, the load is continuously being transferred from one tooth to the next of each of said gears. The reason no such spline drive is created is that the one-way clutch drum 82, and the gear 52 driven thereby, are driven at a speed different from the speed of the planet carrier 30, or the speed of the gear 50; said gear 52, planet carrier 30, and gear 50 comprising the reaction, input and output members, respectively, of the planetary gear train including the planet pinions 40. That is, as long as the drum 82 is driven at a speed different from the speed of the planet carrier 30, or that of the gear 50, the planet gears 40 will not lock-up with its meshing gears 50 and 52 and instead, said planet gears 40 will be in continuous rolling engagement with said gears 50 and 52.

It is also desirable that the speed of rotation of the planet carrier be kept low in order to prevent the bearings of the planet pinions from being subjected to high centrifugal loads. With the aforedescribed construction, the planet carrier 30 is driven at the speed of the gear 18 which, although greater than the speed of the input shaft 10, is not excessive.

Figures 5 and 6 illustrate a modification in which, in the low speed ratio, the planet carrier only rotates at the low speed of the input shaft and, in the high speed ratio, the planet carrier is held stationary. Accordingly, in this modification there is no centrifugal loading on the bearings of the planet pinions in the high speed ratio and, in the low speed ratio, this centrifugal loading is very small.

Referring now to Figures 5 and 6, an input shaft 110 driven at engine speed is provided with a radially extending annular flange 112 to which an annular member 114, having a plurality of circumferentially spaced studs 116, is secured by bolts 118. Planet pinion gears 120 are journaled about the studs 116 and are held in position by the heads of bolts 118. The planet pinions are disposed in meshing engagement between an inner annular gear 122 and an outer annular gear 124 secured to a fixed housing structure 126 by bolts 128.

With this construction, a step-up speed ratio is provided from the input shaft 110 to the gear 122, which step-up drive is quite similar to that provided in Figures 1 to 4. Also, as in Figures 1 to 4, the invention is not limited to this specific form of step-up gearing. In addition, the outer annular gear 124 may be secured to the fixed housing 126 by a suitable flexible support similar to that mentioned in connection with Figures 1 to 4.

The gear 122 is formed integral with an annular gear 130 by intermediate hub portion 132 which is piloted by a bushing 134 about the hub 136 of a planet pinion carrier 138 hereinafter described. An output shaft 140 for the engine supercharger (not shown) is piloted within the hub 136 of the planet carrier by a bushing 142. An output gear 144 formed on a shaft 140 is concentric with the annular gear 130.

The planet carrier 138 is provided with a plurality of studs 146 and 148 extending therefrom. An annular plate 150, secured to the planet carrier 138 by bolts 152 passing through the studs, is provided with a hub portion 154 piloted about a drum 156 secured to the fixed housing 126 by bolts 158. The plate 150 is provided with an outer annular rim portion 159 forming part of a brake 160 engageable to hold the planet carrier 138 stationary and disengageable to permit rotation of the planet carrier.

With this construction, if the planet carrier were provided with planet pinions disposed between, and in meshing engagement with, the concentric gears 130 and 144, then, with the brake 160 engaged, the output shaft 140 would be driven in a direction opposite to that of the gear 130 and the input shaft 110. With such a reversal in the direction of rotation, the reaction torque on the brake 160 would be equal to the sum of the input torque on the gear 130 and the output torque on the shaft 140. However, the torque on the brake 160 may be reduced by providing reversing planet pinions on the planet carrier 138. Thus, as illustrated, the planet carrier 138 is provided with studs 146 and 148 about which planet pinions 162 and 164 respectively are journaled in pairs. The planet pinions 162 and 164 of each pair are disposed in meshing engagement with each other and the planet pinions 162 are disposed in meshing engagement with the outer annular gear 130 while the planet pinions 164 are disposed in meshing engagement with the inner or output gear 144. The relative disposition of the planet pinions 162 and 164 and gears 130 and 144 is best seen in Figure 6. In this way, when the brake 160 is engaged to hold the planet carrier 138 stationary, the drive is from the outer gear 130 through each pair of planet pinions 162 and 164 to the output gear 144 which then rotates in the same direction as the gear 130. With this construction, the reaction torque on the brake 160 is only equal to the difference between the input torque from gear 130 and the output torque on the shaft 140.

The brake 160 is similar to the brake 56 of Figures 1 to 4 and comprises a plurality of annular frictionally-engageable plates 166 and 168, alternately disposed and splined respectively to the outer rim 159 of the planet carrier 138 and to a drum 170 secured to the housing 126 by bolts 172. An annular member 174 is also secured to the housing 126 by the bolts 172 and a piston 176 has seal rings 178 and 179 cooperating with said annular member 174 to provide a sealed annular cylindrical space 180 relative to which the piston 176 is axially slidable. Fluid under pressure is adapted to be supplied to the cylindrical space 180 from a supply conduit 181 through a passage 182 and under the control of a valve 184 to effect clamping engagement or disengagement of the plates 166 and 168. When the valve 184 is in its full-line position, fluid under pressure is admitted to the cylindrical space 180 to engage the brake 160 and when the valve 184 is in its dotted-line position, the cylindrical space 180 is connected to a drain passage 185 to release the brake 160.

When the valve 184 is opened to admit fluid pressure to the brake 160, the friction brake plates 166 and 168 are clampingly engaged to hold the planet carrier 138 against rotation whereby a step-up speed ratio is provided from the gear 130 to the output gear 144 through the pinions 162 and 164. When the valve 184 is closed, the brake 160 disengages and the planet carrier 138 is free to rotate. Accordingly, if there is any load on the output shaft 140 when the brake 160 is disengaged, the output shaft immediately begins to slow down and the planet carrier 138 starts to rotate at a speed which increases or accelerates as the speed of the output shaft 140 falls off. The planet carrier 138 rotates in the same direction as the gear 130 which, in turn, rotates in the same direction as the input shaft 110.

A one-way or over-running clutch having rollers 186 is provided to prevent the planet carrier 138 from rotating at a speed in excess of that of the input shaft 110. With this construction, when the brake 160 is released, the speed of the output shaft 140 slows down and the planet carrier 138 starts to rotate at a speed which increases in correspondence with a decrease in speed of the output shaft until the planet carrier is rotating at the same speed as the input shaft 110, whereupon the one-way clutch rollers 186 engage to prevent any further decrease in the speed of the output shaft 140. Accordingly, when the brake 160 is released, the planet carrier 138 rotates at a speed less than, but in the same direction as, the gear 130 and therefore a step-up speed ratio is provided from the gear 130 to the output shaft 140, but the magnitude of this step-up in the speed ratio obviously is less than the step-up when the brake 160 is engaged.

The one-way or over-running clutch comprises the rollers 186, an internal cylindrical surface on the annular member 114 and an annular cam member 188 splined at 190 to the hub 136 of the planet carrier 138. The cam member 188 is provided with a plurality of cam surfaces having a disposition relative to the direction of rotation similar to the cam surfaces 86 of Figure 3. Accordingly, a transverse sectional view through the one-way clutch of Figure 5 would be similar to Figure 3. With this construction, when the planet carrier 138 and its cam member 188 are held stationary by engagement of the brake 160, the annular member 114 over-runs the rollers 186. When the brake 160 is released, the planet carrier 138 and its cam member 188 immediately start rotating at an increasing or accelerating speed in the direction of rotation of the annular member 114. When the speed of rotation of the planet carrier 138 and its cam member 188 tends to exceed that of the input shaft 110 and member 114, the rollers 186 immediately wedge between their cam surfaces and the annular member 114 to prevent any further increase in the speed of the planet carrier 138.

In the modification of Figures 5 and 6, as in the modification of Figures 1 to 4, the one-way or over-running clutch only rotates at the speed of the input shaft. In addition, because of the acceleration of the cam member just prior to engagement of the clutch, the clutch rollers engage with substantially no shock as more fully described in connection with Figures 1 to 4. Also, as in the modification of Figures 1 to 4, the one-way clutch drum 114 and the reaction member (planet carrier 138) of the planetary gear train including the planet pinions 162 and 164, are driven at a speed different from the speeds of the input and output members (gears 130 and 144) of said gear train, so that said planet gears 162 and 164 operate in continuous rolling engagement with their meshing gears 130 and 144.

In the modification of Figures 5 and 6, as in Figures 1 to 4, the relative rotation of the friction brake plates, just prior to their engagement, is only equal to the low speed of the input shaft, thereby minimizing wear of the brake plates. An additional advantage also present in the modification of Figures 5 and 6 is that the gears are in continuous rolling engagement in both speed ratios.

As disclosed in connection with Figures 1 to 4, it is desirable to keep the speed of rotation of the planet carrier as low as possible in order to minimize the centrifugal loads on the bearings of the planet pinions. In Figures 5 and 6, there is no centrifugal load on these bearings in the high speed ratio, since, in this ratio, the planet carrier is held stationary. In the low speed ratio, the centrifugal load on the planet pinion bearings is quite small, since, in this latter ratio, the planet carrier 138 only rotates at the low speed of the input shaft 110. Accordingly, in Figures 5 and 6, the centrifugal load on the planet pinion bearings is considerably less than the load on the bearings of the planet pinions 40 of Figures 1 to 4 with input shafts having the same speeds of rotation. Obviously, with the modification of Figures 5 and 6, the input shaft 110 may be operated at a speed considerably higher than the speed of the input shaft 10 of Figures 1 to 4 before the load on the bearings of the planet pinions becomes excessive.

In the modification of Figures 5 and 6, the reaction torque on the brake 160 when engaged would be substantially greater than that on the brake 56 of Figures 1 to 4 in the absence of the pinions 164 for reversing the direction of rotation of the output shaft 140. However, with planet pinions 162 and 164 arranged in pairs, as disclosed, the direction of rotation of the output shaft 140 is the same as that of the gear 130 and therefore, as in Figures 1 to 4, the reaction torque on the brake is only equal to the difference between the input and output torques of the associated planetary gear train.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a multi-speed transmission, an input shaft, planetary gear means comprising an input member, an output member and a torque reaction member, means to provide a step-up speed-ratio drive from said input shaft to said input member, means engageable to prevent rotation of said reaction member, and a one-way clutch automatically operative during rotation of said reaction member in response to the reaction torque acting thereon to prevent rotation of said reaction member above a predetermined speed relative to and differing from the speeds of said input and output members.

2. In a multi-speed transmission, an input shaft, planetary gear means comprising an input member, an output member and a torque reaction member, means to provide a step-up speed-ratio drive from said input shaft to said input member, brake means engageable to prevent rotation of said reaction member, means driven by said input shaft at a speed different from the speeds of said input and output members, and a one-way clutch operatively connected between said last-mentioned means and said reaction member, said one-way clutch being arranged to over-run when said brake means is engaged.

3. In a multi-speed transmission, an input shaft, planetary gear means comprising an input member, an output member and a torque reaction member, means to provide a step-up speed-ratio drive from said input shaft to said input member, brake means engageable to prevent rotation of said reaction member, and a one-way clutch operatively connected between said input shaft and said reaction member, said one-way clutch being arranged to over-run when said brake means is engaged.

4. In a multi-speed transmission, an input shaft, planetary gear means comprising an input member, an output member and a torque reaction member, means to provide a step-up speed-ratio drive from said input shaft to said input member, means engageable to prevent rotation of said reaction member, said planetary gear means providing a step-up speed-ratio drive between its input and output members when said reaction member is prevented from rotating, and means operable during rotation of said reaction member in response to the reaction torque acting thereon to prevent its rotation above a predetermined speed relative to and differing from the speeds of said input and output members.

5. In a multi-speed transmission, an input shaft, planetary gear means comprising an input member, an output member and a torque reaction member, means to provide a step-up speed-ratio drive from said input shaft to said input member, means engageable to prevent rotation of said reaction member, said planetary gear means providing a step-up speed-ratio drive between its input and output members when said reaction member is prevented from rotating, means driven from said input shaft at a speed different from the speeds of said input and output members, and a one-way clutch operatively connected between said reaction member and said last-mentioned means, said one-way clutch being arranged to over-run when said rotation of said reaction gear is prevented.

6. In a multi-speed transmission, an input shaft, planetary gear means comprising first, second and third members and a plurality of planet pinions carried by said first member, said second and third members comprising gears connected by said planet pinions, an output shaft drivably connected to said second member, means to provide a step-up speed-ratio drive from said input shaft to one of said first and third members, means engageable to prevent rotation of the other of said first and third members, and a one-way clutch automatically operative during rotation of said last-mentioned member to prevent its rotation above the speed of said input shaft.

7. In a multi-speed transmission, an input shaft, planetary gear means comprising an output gear, a reaction gear, a rotatable member concentric with said gears, a plurality of planet pinions carried by said rotatable member in engagement with said gears, means to provide a step-up speed-ratio drive from said input shaft to said rotatable member, means engageable to prevent rotation of said reaction gear, and means operable during rotation of said reaction gear in response to the reaction torque thereon to prevent its rotation above a predetermined speed relative to and differing from the speeds of said input and output members.

8. In a multi-speed transmission, an input shaft, planetary gear means comprising an output gear, a reaction gear, a rotatable member concentric with said gears, a plurality of planet pinions carried by said rotatable member in engagement with said gears, means to provide a step-up speed-ratio drive from said input shaft to said rotatable member, means engageable to prevent rotation of said reaction gear, and a one-way clutch operatively connected between said input shaft and said reaction gear, said one-way clutch being arranged to over-run when rotation of said reaction gear is prevented.

9. In a multi-speed transmission, an input shaft, planetary gear means comprising an output gear, a reaction gear, a rotatable member concentric with said gears, a plurality of planet pinions carried by said rotatable member in engagement with said gears, means to provide a step-up speed-ratio drive from said input shaft to said rotatable member, means engageable to prevent rotation of said reaction gear, said planetary gear means providing a step-up speed-ratio drive between said rotatable member and output gear when said reaction gear is prevented from rotating, and means operable during rotation of said reaction gear in response to reaction torque thereon to prevent its rotation in excess of that of said input shaft.

10. In a multi-speed transmission, an input shaft, planetary gear means comprising an input gear, an output gear, a rotatable member concentric with said gears, a plurality of planet pinions carried by said rotatable member, said planet pinions being arranged to drivably connect said gears, means to provide a step-up speed-ratio drive from said input shaft to said input gear, means engageable to prevent rotation of said rotatable member, and means operable during rotation of said rotatable member to prevent its rotation at a speed in excess of that of said input shaft.

11. In a multi-speed transmission, an input shaft, planetary gear means comprising an input gear, an output gear, a rotatable member concentric with said gears, a plurality of planet pinions carried by said rotatable member, said planet pinions being arranged to drivably connect said gears, means to provide a step-up speed-ratio drive from said input shaft to said input gear, means engageable to prevent rotation of said rotatable member, and a one-way clutch operatively connected between said input shaft and said rotatable member, said one-way clutch being arranged to over-run when rotation of said rotatable member is prevented.

12. In a multi-speed transmission, an input shaft, planetary gear means comprising an input gear, an output gear, a rotatable member concentric with said gears, a plurality of planet pinions carried by said rotatable member, said pinions being arranged to drivably connect said gears, means to provide a step-up speed-ratio drive from said input shaft to said input gear, means engageable to prevent rotation of rotatable member, said planetary gear means providing a step-up speed-ratio drive between said input and output gears when said rotatable member is prevented from rotating, and means operable during rotation of said member to prevent its rotation in excess of that of said input shaft.

13. In a multi-speed transmission, an input shaft, planetary gear means comprising an input gear, an output gear, a rotatable member concentric with said gears, a plurality of planet pinions carried by said rotatable member, said planet pinions being arranged in pairs with the pinions of each pair in meshing engagement with each other and with one of said gears disposed in meshing engagement with one of the pinions of each pair and with the other of said gears disposed in meshing engagement with the other pinion of each pair, means engageable to prevent rotation of said rotatable member in response to the reaction torque thereon, and means operable during rotation of said rotatable member to prevent its rotation above a predetermined speed relative to and differing from the speeds of said input and output gears.

14. In a multi-speed transmission, an input shaft, planetary gear means comprising an input gear, an output gear, a rotatable member concentric with said gears, a plurality of planet pinions carried by said rotatable member, said planet pinions being arranged in pairs with the pinions of each pair in meshing engagement with each other and with one of said gears disposed in meshing engagement with one of the pinions of each pair and with the other of said gears disposed in meshing engagement with the other pinion of each pair, means engageable to prevent rotation of said rotatable member, means driven by said input shaft at a speed different from the speeds of said input and output gears, and a one-way clutch operatively connected between said last-mentioned means and said rotatable member, said one-way clutch being arranged to over-run when rotation of said rotatable member is prevented.

15. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; a rotatable member; gearing connecting said rotatable member to one of said input and output members for rotation in the direction of said reaction torque at a speed differing from the speeds of said input and output members; and a clutch engageable, only upon disengagement of said brake, for constraining said reaction member to rotation with said rotatable member.

16. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; a rotatable member; gearing connecting said rotatable member to one of said input and output members for rotation in the direction of said reaction torque at a speed differing from the speeds of said input and output members; and a one-way clutch engageable, only upon disengagement of said brake, for constraining said reaction member to rotation with said rotatable member.

17. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; and gearing including an engageable and disengageable device engageable, upon disengagement of said brake, for operatively connecting said reaction member to one of said input and output members for constraining said reaction member to rotation in the direction of said reaction torque at a speed differing from the speeds of said input and output members.

18. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; a rotatable member connected to one of said input and output members; and means including an engageable and disengageable device engageable, upon disengagement of said brake, for operatively connecting said reaction member to said rotatable member for constraining said reaction member to rotation in the direction of said reaction torque at a speed differing from the speeds of said input and output members.

CHARLES S. DAVIS, Jr.
GEORGE B. DU BOIS.
STANLEY W. BAKER.

REFERENCES CITED

The following references are of record in the file of this patent:

UNITED STATES PATENTS

| Number | Name | Date |
|---|---|---|
| 1,791,393 | Voile | Feb. 3, 1931 |
| 2,022,058 | Steuber | Nov. 26, 1935 |
| 2,301,072 | Nardone | Nov. 3, 1942 |
| 2,368,835 | Hill | Feb. 6, 1945 |
| 2,407,699 | Hill | Sept. 17, 1946 |
| 2,473,157 | Lucia et al. | June 14, 1949 |